(12) United States Patent  
Zhang et al.

(10) Patent No.: US 9,932,993 B2  
(45) Date of Patent: Apr. 3, 2018

(54) SYSTEM AND METHOD FOR HYDRAULIC ENERGY RECOVERY

(71) Applicant: Caterpillar Inc., Peoria, IL (US)

(72) Inventors: Jiao Zhang, Naperville, IL (US); Dayao Chen, Bolingbrook, IL (US); Jeremy T. Peterson, Washington, IL (US); Michael L. Knussman, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 6 days.

(21) Appl. No.: 14/936,137

(22) Filed: Nov. 9, 2015

(65) Prior Publication Data

US 2017/0130744 A1    May 11, 2017

(51) Int. Cl.
| | |
|---|---|
| *F15B 11/024* | (2006.01) |
| *F15B 11/08* | (2006.01) |
| *F15B 1/04* | (2006.01) |
| *F15B 1/26* | (2006.01) |
| *F15B 21/14* | (2006.01) |
| *F15B 1/027* | (2006.01) |

(Continued)

(52) U.S. Cl.
CPC ............ *F15B 11/024* (2013.01); *F15B 1/024* (2013.01); *F15B 1/027* (2013.01); *F15B 1/04* (2013.01); *F15B 1/26* (2013.01); *F15B 11/08* (2013.01); *F15B 13/021* (2013.01); *F15B 21/14* (2013.01); *F15B 2201/00* (2013.01); *F15B 2211/20569* (2013.01); *F15B 2211/3058* (2013.01); *F15B 2211/3133* (2013.01); *F15B 2211/88* (2013.01)

(58) Field of Classification Search
CPC .......... F15B 1/024; F15B 1/027; F15B 1/033; F15B 1/04; F15B 1/26; F15B 11/024; F15B 11/08; F15B 13/021; F15B 21/14; F15B 2201/00; F15B 2211/20569; F15B 2211/3058; F15B 2211/3133; F15B 2211/88

See application file for complete search history.

(56) References Cited

U.S. PATENT DOCUMENTS

| | | | | |
|---|---|---|---|---|
| 6,789,387 | B2 * | 9/2004 | Brinkman | E02F 9/2217 60/414 |
| 7,905,088 | B2 * | 3/2011 | Stephenson | E02F 9/2217 60/414 |

(Continued)

FOREIGN PATENT DOCUMENTS

| | | |
|---|---|---|
| WO | 2014112566 | 7/2014 |
| WO | 2014135285 | 9/2014 |

*Primary Examiner* — Logan Kraft

(57) ABSTRACT

A hydraulic control system for a machine is provided. The hydraulic control system includes a fluid reservoir, a pump motor and an accumulator. The pump motor is configured to provide pressurized fluid and to receive fluid to provide a power output. The hydraulic control system further includes a hydraulic actuator having a first and a second chamber, a first valve, a regenerative valve, and a controller. The controller is in communication with the first valve and the regenerative valve to selectively actuate the regenerative valve to allow flow of a first portion of the fluid from the first chamber to the second chamber. The controller is further configured to selectively actuate the first valve to allow flow of a second portion of the fluid from the first chamber through the pump motor to provide the power output to a shaft of a power source.

20 Claims, 8 Drawing Sheets

(51) Int. Cl.
*F15B 1/02* (2006.01)
*F15B 13/02* (2006.01)

(56) References Cited

U.S. PATENT DOCUMENTS

| | | |
|---|---|---|
| 9,051,944 B2 | 6/2015 | Wen |
| 2012/0180470 A1 | 7/2012 | Schroeder et al. |
| 2012/0233997 A1 | 9/2012 | Andruch, III et al. |
| 2013/0318955 A1 | 12/2013 | Zang et al. |
| 2014/0123633 A1 | 5/2014 | Rosth |

* cited by examiner

SYSTEM AND METHOD FOR HYDRAULIC ENERGY RECOVERY

TECHNICAL FIELD

The present disclosure relates generally to a hydraulic control system for a machine and, and more particularly, to a system and method for recovering hydraulic energy in the hydraulic control system.

BACKGROUND

Hydraulically operated machines, such as, wheel loaders, excavators mining shovels etc. are typically employed to move heavy loads, such as construction material, debris and/or any other material. These machines utilize an implement system to carry the load. The implement system is generally powered by one or more hydraulic actuators which are fluidly coupled to an engine driven pump. The pump selectively supplies pressurized fluid into the chambers of the hydraulic actuators. As the pressurized fluid moves into or through the chambers, the pressure of the fluid acts on hydraulic surfaces of pistons within the chambers of the hydraulic actuators, to affect movement of the hydraulic actuators and thus a movement of the implement system is achieved.

During operation of such machine, the implement system may be raised to an elevated position, and lowered. As the implement system is relatively heavy and also carry load, the implement gains potential energy when raised to the elevated position. Typically, as the implement is lowered from the elevated position, this potential energy may be converted to heat as the pressurized hydraulic fluid is forced out of the hydraulic actuator and is throttled across a valve and returned to a tank. The conversion of potential energy into heat may result in an undesired heating of the hydraulic fluid, which may require the machine to have an additional cooling mechanism and additional capacity.

U. S. Publication No. 2014/0123633 (Hereinafter referred to as '633 Publication'). The '633 Publication discloses a hydraulic system having a hydraulic cylinder, and a pump configured to supply fluid to the hydraulic cylinder. Further, the '633 patent application discloses a tank, a supply conduit connecting the pump with the hydraulic cylinder, a return conduit connecting the hydraulic cylinder with the tank, and a hydraulic accumulator. The hydraulic system is configured to direct fluid from the hydraulic accumulator into an expanding chamber of the hydraulic cylinder during an overrunning load condition.

SUMMARY OF THE DISCLOSURE

In one aspect of the present disclosure, a hydraulic control system for a machine is provided. The hydraulic control system includes a fluid reservoir and a pump motor coupled to a power source via a shaft. The pump motor is fluidly coupled to the fluid reservoir. The pump motor is configured to provide pressurized fluid and to receive fluid to provide a power output to the shaft. The hydraulic control system further includes a hydraulic actuator, an accumulator and a first valve. The hydraulic actuator has a first chamber and a second chamber, each of the chambers being fluidly coupled to the pump motor. The accumulator is fluidly coupled to one of the chambers of the hydraulic actuator to receive fluid from the hydraulic actuator for storage and to the pump motor. In a first mode the accumulator is configured to provide stored fluid to the pump motor and in a second mode the pump motor is configured to provide pressurized fluid to the accumulator. The first valve is fluidly coupled between the first chamber of the hydraulic actuator and the pump motor. The first valve is movable between an open position and a closed position. The hydraulic control system further includes a regenerative valve and a controller. The regenerative valve is fluidly coupled between the first chamber of the hydraulic actuator and the second chamber of the hydraulic actuator. The regenerative valve is movable between an open position and a closed position. The controller is in communication with the first valve and the regenerative valve. The controller is configured to selectively actuate the regenerative valve to allow flow of a first portion of the fluid from the first chamber of the hydraulic actuator to the second chamber of the hydraulic actuator. The controller is further configured to selectively actuate the first valve to allow flow of a second portion of the fluid from the first chamber of the hydraulic actuator through the pump motor to provide the power output to the shaft and reduce a power needed from the power source for machine operation.

In another aspect of the present disclosure, a method of operating a hydraulic control system having an implement system movable through a range of motion is provided. The method includes detecting movement of an implement system in a descending direction. The method further includes actuating a regenerative valve to allow flow of a first portion of a fluid from a first chamber of a hydraulic actuator to a second chamber of the hydraulic actuator. The method furthermore includes actuating a first valve to allow flow of a second portion of the fluid from the first chamber of the hydraulic actuator through a pump motor to provide a power output to a shaft coupled between the pump motor and a power source.

In yet another aspect of the present disclosure, a machine is provided. The machine includes a power source, a fluid reservoir, and a pump motor coupled to a power source via a shaft. The pump motor may be fluidly coupled to the fluid reservoir, the pump motor configured to provide pressurized fluid and to receive fluid to provide a power output to the shaft. The machine further includes a hydraulic actuator, an accumulator and a first valve. The hydraulic actuator includes a first chamber and a second chamber, each of the chambers being fluidly coupled to the pump motor. The accumulator is fluidly coupled to one of the chambers of the hydraulic actuator to receive fluid from the hydraulic actuator for storage and to the pump motor. In a first mode the accumulator is configured to provide stored fluid to the pump motor and in a second mode the pump motor is configured to provide pressurized fluid to the accumulator. The first valve is fluidly coupled between the first chamber of the hydraulic actuator and the pump motor. The first valve is movable between an open position and a closed position. The machine further includes a regenerative valve and a controller. The regenerative valve is fluidly coupled between the first chamber of the hydraulic actuator and the second chamber of the hydraulic actuator. The regenerative valve is movable between an open position and a closed position. The controller is in communication with the first valve and the regenerative valve. The controller is configured to selectively actuate the regenerative valve to allow flow of a first portion of the fluid from the first chamber of the hydraulic actuator to the second chamber of the hydraulic actuator. The controller is further configured to selectively actuate the first valve to allow flow of a second portion of the fluid from the first chamber of the hydraulic actuator through the pump motor to provide the power output to the shaft and reduce a power needed from the power source for machine operation.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
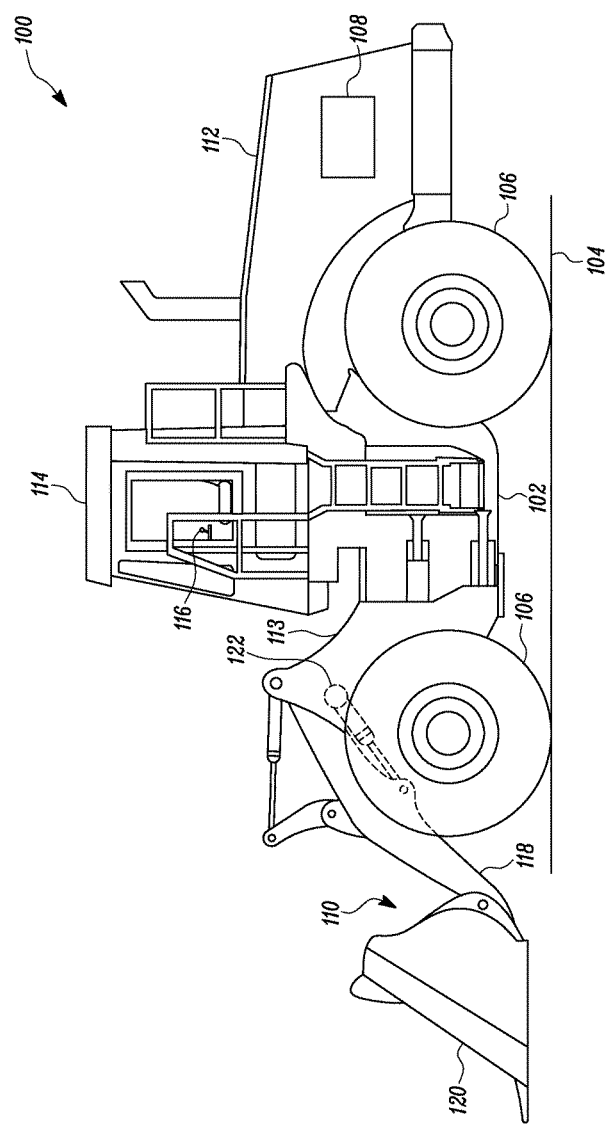
FIG. 1 is a side view of an exemplary machine in a first position.
Figure 2:
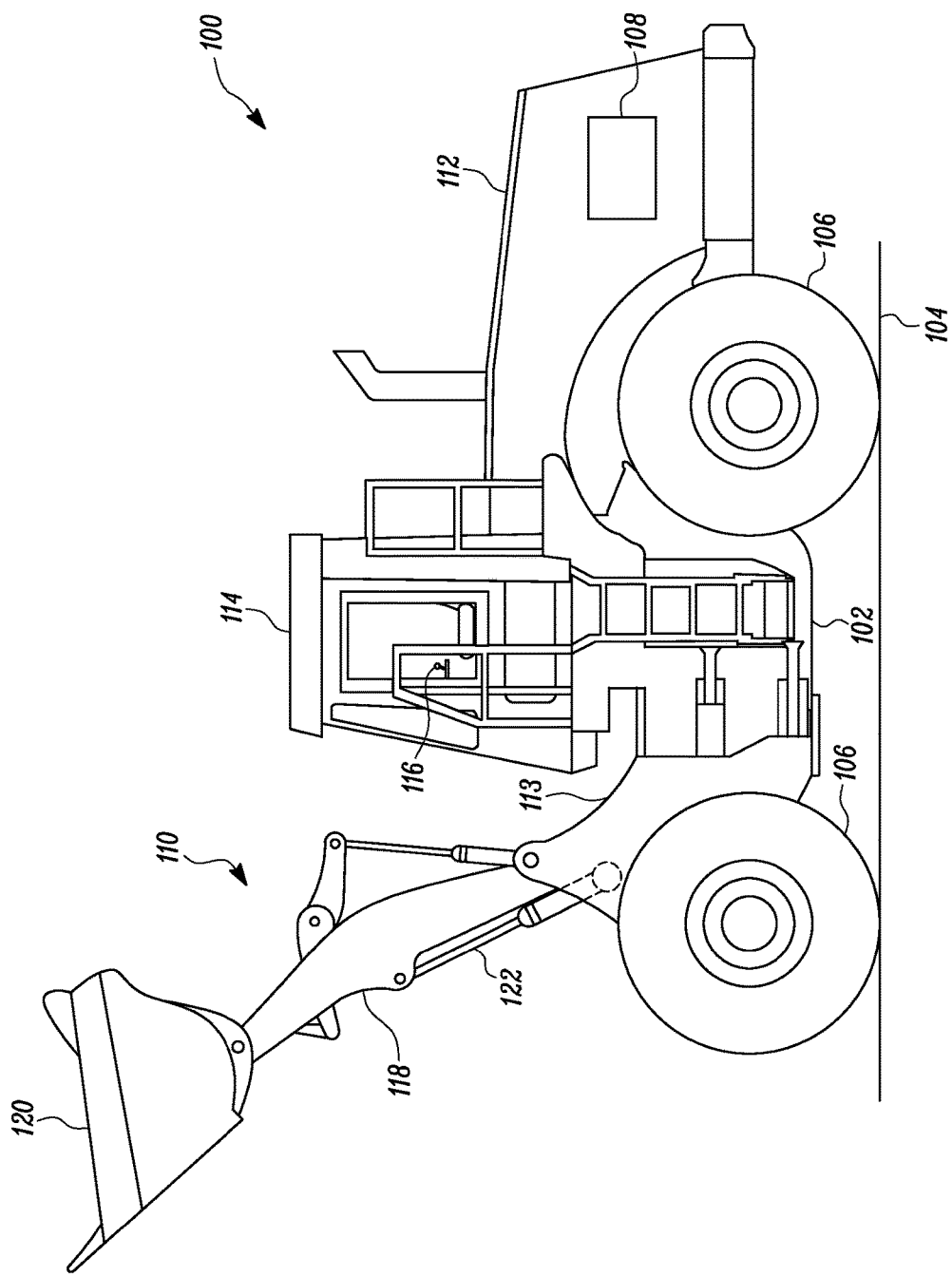
FIG. 2 is a side view of the exemplary machine of FIG. 1 in a second position.
Figure 3:
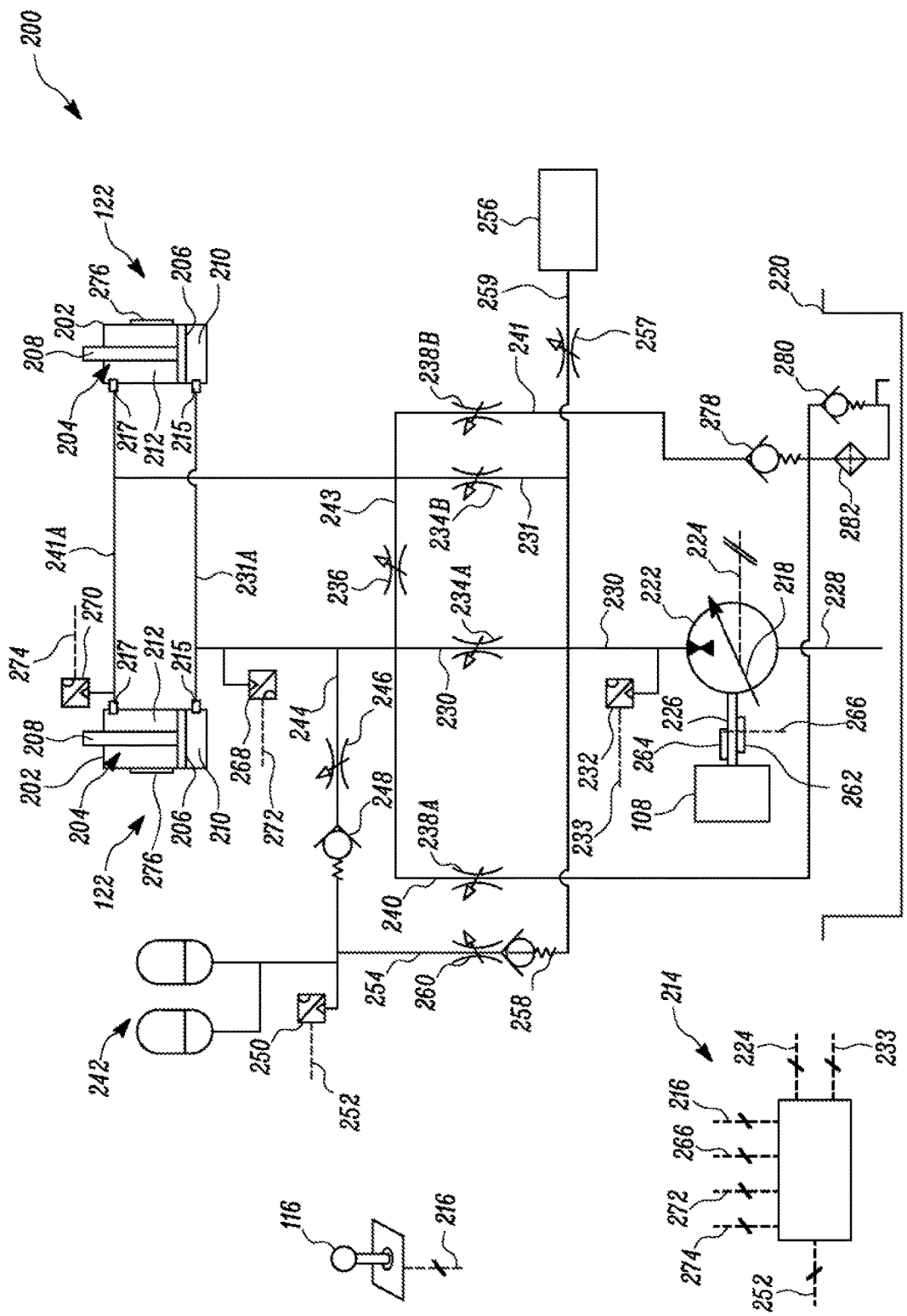
FIG. 3 is a schematic illustration of a hydraulic control system, according to an embodiment of the present disclosure.

In an embodiment, FIG. 1 and FIG. 2 illustrate side views of an exemplary machine 100 in a first position and a second position, respectively. The machine 100 has multiple systems and components that cooperate to carry out various activities, such as excavation, carrying, scooping, or otherwise moving material. In the illustrated embodiment, the machine 100 is a wheel loader. However, it may be contemplated that the machine 100 may alternatively be an excavator, a backhoe loader, a front shovel, a dragline excavator, a crane, or any another similar machine.

The machine 100 may include an undercarriage 102 for moving the machine 100 over a ground surface 104. The undercarriage 102 includes ground engaging members 106 for supporting the machine 100 and for engaging with the ground surface 104 in order to move the machine 100 along the ground surface 104. In the illustrated embodiment, the ground engaging members 106 are a set of wheels. However, in other aspect of the present disclosure, the ground engaging members 106 may be a pair of tracks. Further, a power source 108 may be provided for powering to the ground engaging members 106. The power source 108 may be an internal combustion engine, for example, a diesel engine, a gasoline engine, a gaseous fuel engine, or any other type of combustion engine known in the art. In alternative embodiments, for example when the machine 100 is a mining shovel, the power source 108 may be an electric motor.

The machine 100 further includes a frame 112 disposed on the undercarriage 102. The frame 112 may support various components of the machine 100 including an operator cab 114 and an implement system 110, and may include a front frame portion 113. The operator cab 114 may enclose various control members, such as one or more levers, pedals, and the like, for controlling operations of the machine 100 in response to inputs from an operator. The operator cab 114 may be provided with an operator input device 116 which is configured to receive operator's input indicative of a desired movement of the implement system 110. The operator input device 116 (hereinafter referred to as "input device 116") may have proportional-type controllers configured to position and/or orient the implement system 110 by producing signals that are indicative of a desired implement system speed, movement, direction etc.

The implement system 110 includes a boom member 118 pivotally connected to the front frame portion 113 and an implement 120 pivotably connected to the boom member 118. The boom member 118 may be moved relative to the frame 112 and the ground surface 104 through a range motion for example between its first position (shown in FIG. 1), and its second position (shown in FIG. 2). The movement of the implement system 110 is caused by one or more hydraulic actuators 122. The one or more hydraulic actuators 122 may be connected between the front frame portion 113 and the implement system 110. The input from the input device 116 may be indicative of the direction (to raise or lower) the implement system 110. Further, the input from the input device 116 may also be indicative of rate or velocity at which the implement system 110 is required to be raised or descended.

Referring now to FIG. 3 to FIG. 7, which illustrate a hydraulic control system 200 adapted to selectively direct pressurized hydraulic fluid into and out of the hydraulic actuators 122. In an embodiment of the present disclosure, there are two hydraulic actuators 122. While the illustrated embodiment has two hydraulic actuators 122, there may be only a single hydraulic actuator or more than two hydraulic actuators. The hydraulic actuators 122 are embodied as double acting hydraulic cylinders. The hydraulic actuators 122 include a cylindrical housing 202 and a piston-rod assembly 204. The cylindrical housing 202 of the hydraulic actuator 122 has an inner surface (not numbered) defining a hollow cavity and the piston-rod assembly 204 may be adapted to slide on the inner surface within the cavity. The piston-rod assembly 204 includes a piston 206 and a rod member 208. The piston 206 is sized and shaped to fit closely against the inner surface of the cylindrical housing 202.

The piston 206 may divide the hollow cavity within the cylindrical housing 202 into a first chamber 210 and a second chamber 212. Further, the cylindrical housing 202 may be provided with a head end port 215 associated with the first chamber 210 and a rod end port 217 associated with the second chamber 212. Pressurized hydraulic fluid may flow into and out of the first and second end chambers 210, 212, through their respective ports 215, 217 to create a pressure differential between them, which may cause movement of the piston-rod assembly 204. One end of the rod member 208 is connected to the piston 206, and an opposite end portion of the rod member 208 is connected to the implement system 110 (shown in FIGS. 1 and 2 connected to the boom member 118). Therefore, the movement of the piston 206 may correspond to the movement of the implement system 110. It may herein be noted that once the implement system 110 is raised, due to weight of the implement system 110 and weight of material carried by the implement system 110, certain amount of potential energy may be stored. Thereafter, when the implement system 110 is lowered, the piston 206 also moves pressurizing the fluid contained in the first chamber 210 in relation to the potential energy of the implement system 110.

According to an embodiment of the present disclosure, the hydraulic control system 200 further includes a controller 214 communicating with the input device 116 through a communication link 216. The hydraulic control system 200 further includes a fluid reservoir 220, and a pump motor 222 in fluid communication with the fluid reservoir 220. The fluid reservoir 220 may be adapted to store hydraulic fluid at a low pressure. Although only a single fluid reservoir 220 is shown, it is also contemplated that hydraulic control system 200 may be in fluid communication with multiple, separate fluid reservoirs, such as the fluid reservoir 220.

The pump motor 222, such as, e.g., an over center pump, may be adapted to function both as a pump and a motor. The pump motor 222 may be in communication with the controller 214 through a communication link 224. More specifically, a swashplate 218 is movable by actuation of actuators working together to vary the displacement of the swashplate 218 to a desired angle, and control of the relative position of such actuators can be accomplished via a solenoid controlled spool valve (not shown) that is in communication with the controller 214 though the communication link 224. The controller 214 may be adapted to switch the pump motor 222 between its operation as a pump and as a motor. During its operation as a pump, the pump motor 222 may act as variable positive displacement pump such that movement of the swashplate 218, which is contained within the pump, controls the output flow of the pump from a minimum to maximum. Likewise, during its operation as a motor, the pump motor 222 may have a variable displacement such that the input flow from the motor can be varied from a minimum to maximum.

The pump motor 222 may be mechanically connected to the power source 108 via a shaft 226. During operation as a motor, the pump motor 222 may provide power output (or torque assistance) to the shaft 226. The shaft 226 may additionally be coupled to drive other auxiliary loads that may be there on the machine 100.

The pump motor 222 includes a first conduit 228 and a second conduit 230 connected on opposite side of the pump motor 222. The first conduit 228 of the pump motor 222 may be fluidly coupled to the fluid reservoir 220. During operation as a pump, the pump motor 222 may draw the hydraulic fluid from the fluid reservoir 220, through the first conduit 228, at ambient or low pressure and may pressurize the hydraulic fluid. The pressurized hydraulic fluid flow may exit through the second conduit 230 that is fluidly coupled to the pump motor 222. A pump motor pressure sensor 232 may be provided at the second conduit 230. The pump motor pressure sensor 232 may be in communication with the controller 214 through a communication link 233, to give signals indicative of pressure at the second end of the pump motor 222 or discharge side when functioning as a pump. Based on the signals given to the controller 214 through the communication link 233, the controller 214 may control the movement of the swashplate 218 to regulate the output flow from the pump. Further, when the pump motor 222 is working as a motor, the controller 214 through the communication link 233 may control the movement of the swashplate 218 to regulate the output torque at the shaft 226.

The second conduit 230, and a third conduit 231 are fluidly coupled between the pump motor 222 and the hydraulic actuators 122, and is shown to have branch portions 231A, 241A to connect to the respective chambers of the two actuators. An implement valve is included on the second conduit 230 to regulate pressurized flow between the pump motor 222 and the hydraulic actuators 122. In an embodiment, two first valves 234A, B are provided on the second conduit 230, and the third conduit 231, as the implement valve, to either allow or to stop the flow of fluid from the pump motor 222 to the hydraulic actuators 122, although a single valve can be used instead of the two first valves 234A, B shown in the figures. Specifically, the first valves 234A, B may be fluidly coupled between the first and second chambers 210, 212 of the hydraulic actuators 122 and the pump motor 222. The first valves 234A, B can be solenoid controlled proportional valves capable of receiving communication of displacement input signal from the controller 214, and moving between an open and a closed position.

A regenerative valve 236 is fluidly coupled between the first chamber 210 of the hydraulic actuator 122 and the second chamber 212 of the hydraulic actuator 122 via a fifth conduit 243 coupled between the second conduit 230 and the third conduit 231. When the regenerative valve 236 is open, the fluid flow from one chamber, such as, e.g., the first chamber 210, of the hydraulic actuator 122 may flow to the other chamber, such as, e.g., the second chamber 212, of the hydraulic actuator 122. Similarly, fluid flow may also flow via the regenerative valve 236 from the second chamber 212 to the first chamber 210. The regenerative valve 236 can be solenoid controlled proportional valves capable of receiving communication of displacement input signal from the controller 214, and moving between an open and a closed position.

Further, two second valves 238A, B may be provided on sixth conduits 240 connecting the third conduit 231 and a fourth conduit 241 to the fluid reservoir 220. The second valves 238A, B may also be in communication with the controller 214, and the controller 214 may move the second valves 238A, B between its closed and open position. The second valves 238A, B can be solenoid controlled proportional valves capable of receiving communication of displacement input signal from the controller 214, and moving between an open and a closed position. In an open position, the second valves 238A, B may allow fluid from the chambers of the hydraulic actuator 122 to be drained to the fluid reservoir 220.

Figure 4:
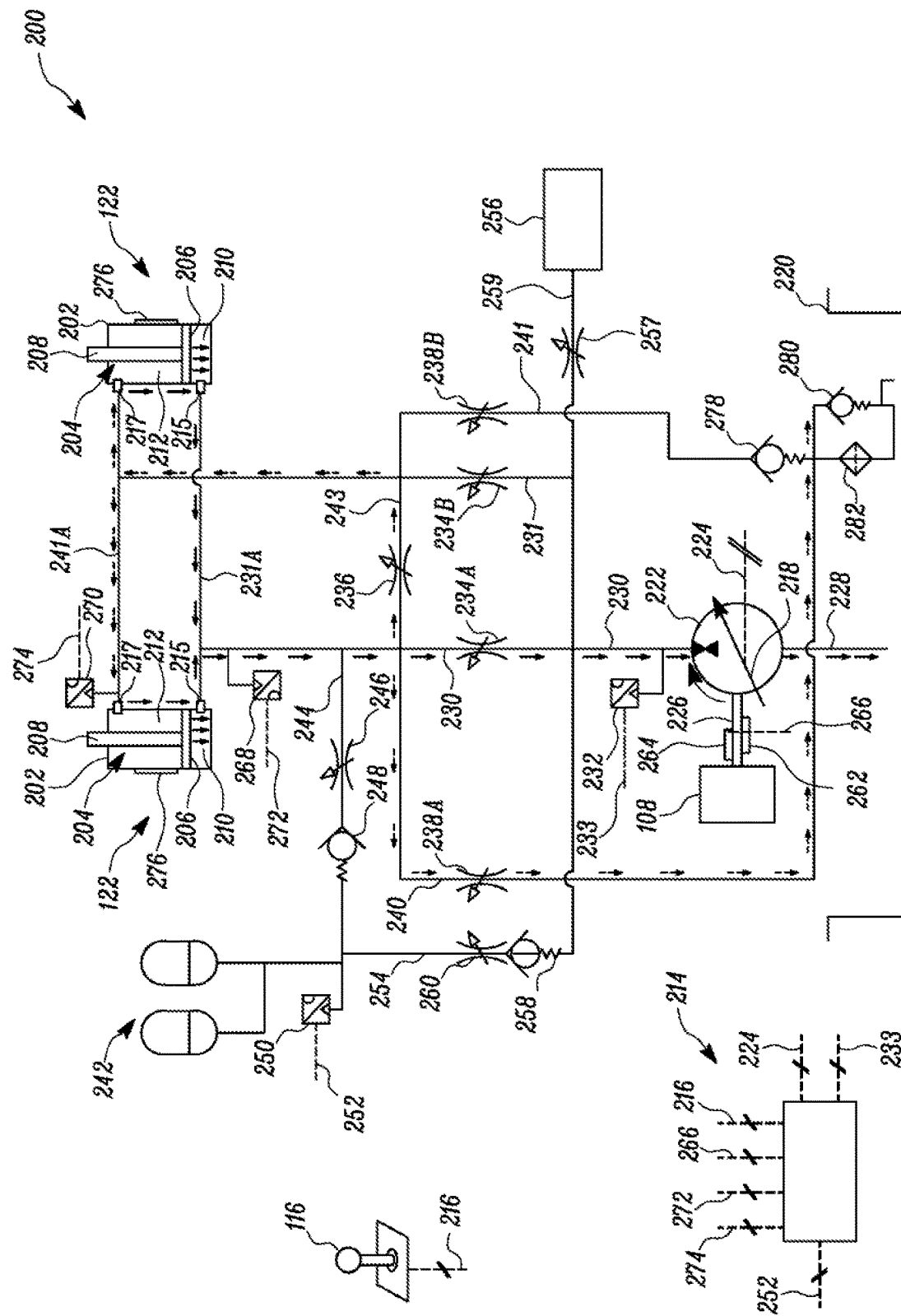
FIG. 4 is another schematic illustration of the hydraulic control system, according to an embodiment of the present disclosure.

According to an embodiment, the pressurized fluid from the pump motor 222 may be communicated to the first chamber 210 of the hydraulic actuator 122, thereby moving the piston-rod assembly 204 to lift the implement system 110. Here, pressurized fluid is directed through the second conduit 230 and the third conduit 231 by commanding the first valve 234A to move to a desired position and to the first chambers 210 via the branch portion 231A. In a different scenario, as shown in FIG. 4, i.e. during descent of the implement system 110, the pressurized fluid from the first chamber 210 of the hydraulic actuator 122, may be communicated to the second chamber 212 of the hydraulic actuator 122, by commanding the regenerative valve 236 to an open position. Additionally, or independently, the pressurized fluid from the first chamber 210 may be communicated through the first valve 234A to drive the pump motor 222 as the motor and provide output torque at the shaft 226, thereby supplementing the power generated by the power source 108. Here, pressurized fluid from the first chambers 210 is directed through the branch portion 231A, the third conduit 231, and the second conduit 230 by commanding the first valve 234A to move to a desired position, where the fluid is eventually returned to the fluid reservoir 220. Herein the pump motor 222 may operate as a hydraulic motor i.e. the pump motor 222 may rotate in a first rotation direction, as shown in FIG. 4.

The hydraulic control system 200 further includes at least one fluid storage device, such as an accumulator 242. The accumulator 242 is adapted to store pressurized hydraulic fluid. The accumulator 242 is fluidly coupled to the pump motor 222 and the hydraulic actuators 202, through an accumulator conduit 244. More specifically, the accumulator conduit 244 is coupled between the second conduit 230 downstream to the first valve 234A and the accumulator 242. In a first mode, the accumulator 242 is configured to provide stored fluid to the pump motor 222. In a second mode, the pump motor 222 is configured to provide pressurized fluid to the accumulator 242. It may herein be noted that although FIGS. 3 to 7 illustrate two accumulators; there may be fewer or more number of accumulators in the hydraulic control system 200.

The accumulator conduit 244 may include an accumulator charge valve 246 to allow or restrict flow of fluid through to the accumulator 242 from the second conduit 230. The accumulator charge valve 246 may be in communication with the controller 214. The accumulator charge valve 246 can be solenoid controlled proportional valves capable of receiving communication of displacement input signal from the controller 214, and moving between an open and a closed position. Further, the accumulator conduit 244 may include a one way check valve 248 between the second conduit 230 and the accumulator 242. The one way check valve 248 may be configured to provide one-way flow direction when opened based upon a predetermined pressure as provided with the force setting of its spring.

Figure 5:
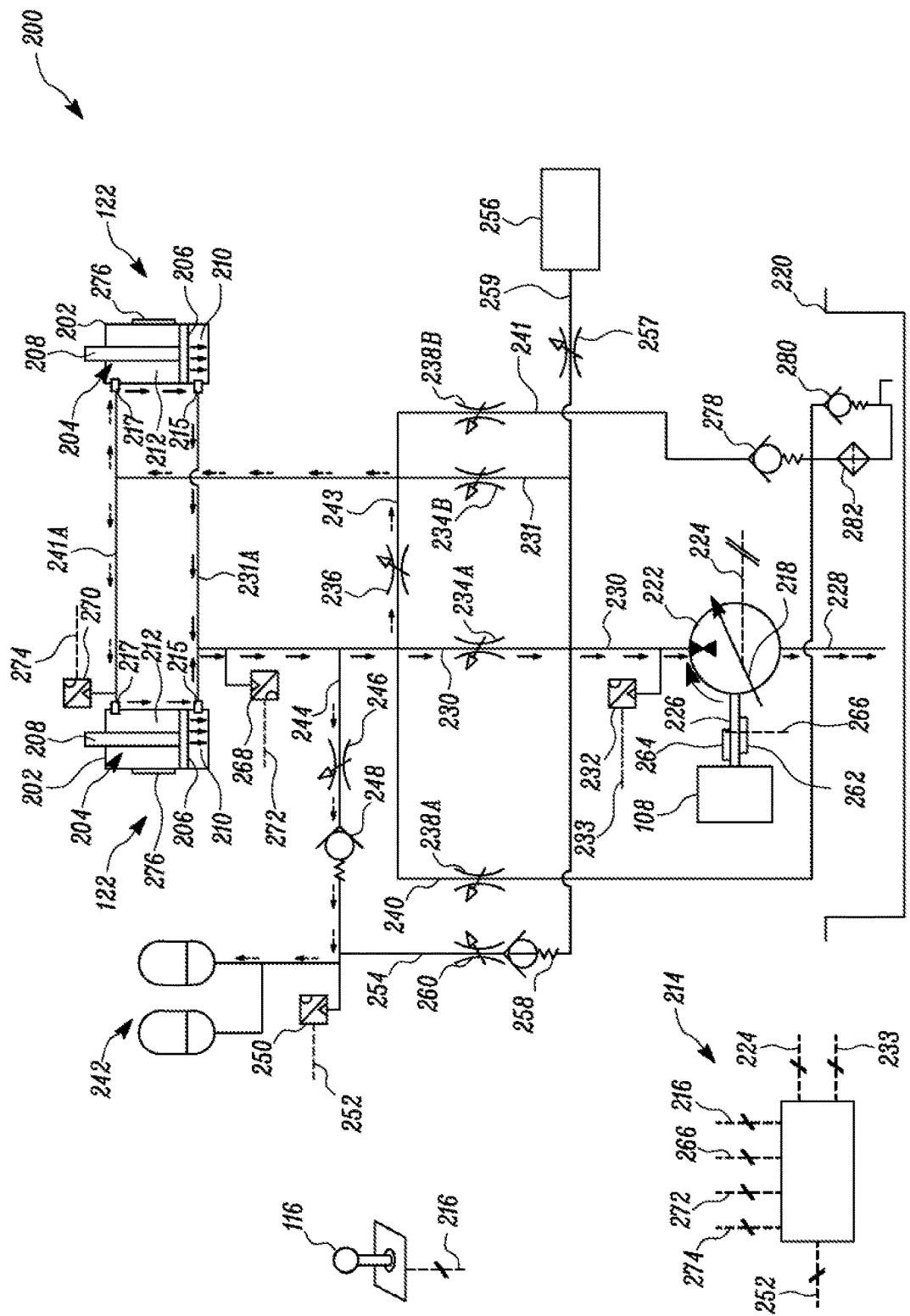
FIG. 5 is another schematic illustration of the hydraulic control system, according to an embodiment of the present disclosure.

An accumulator pressure sensor 250 can be provided to indicate the pressure at the accumulator 242. The accumulator pressure sensor 250 may be in communication with the controller 214 through a communication link 252, and may provide accumulator pressure inputs to the controller 214. The open position of the accumulator charge valve 246 and the one way check valve 248 is illustrated in FIG. 5.

Figure 7:
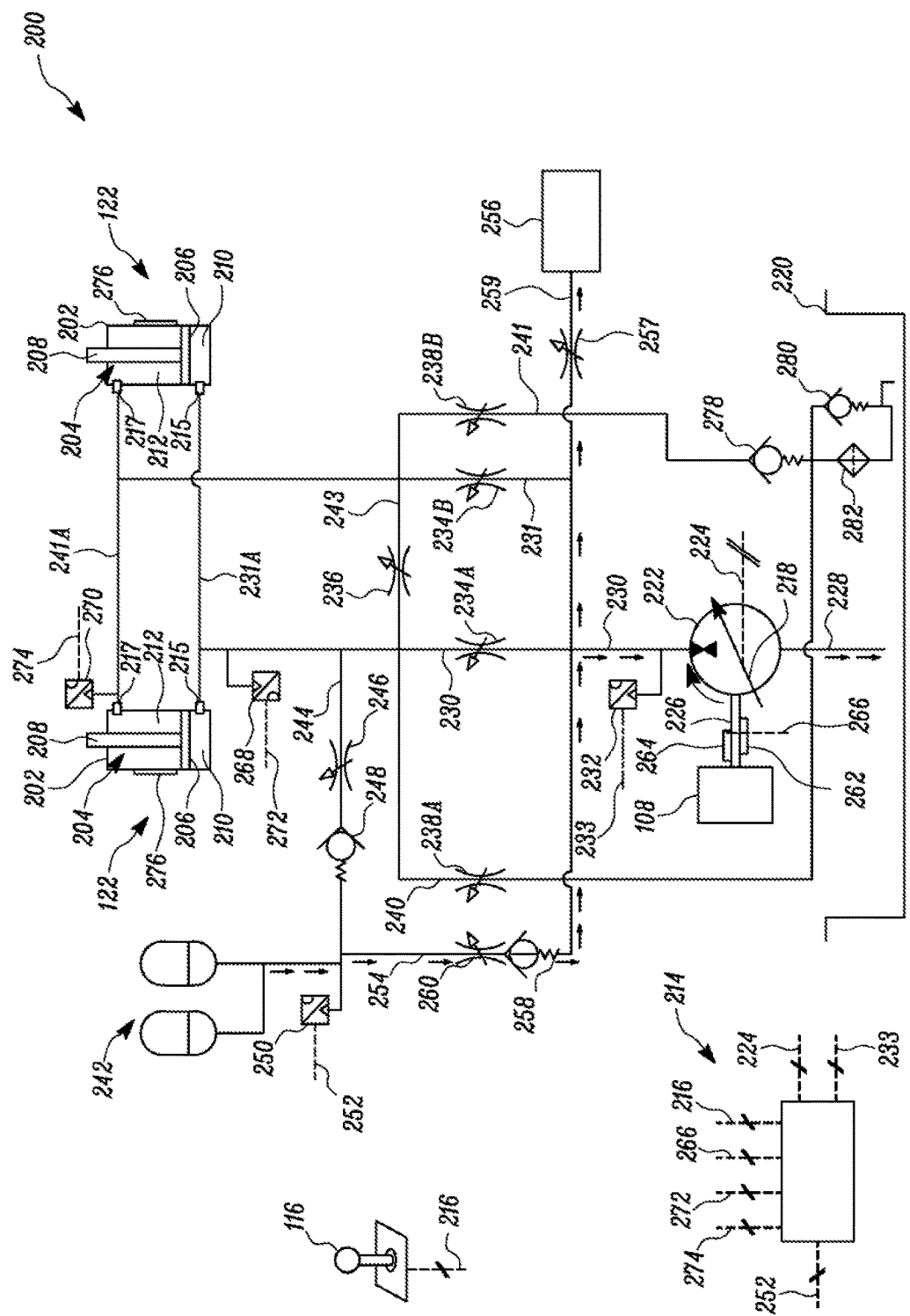
FIG. 7 is another schematic illustration of the hydraulic control system, according to an embodiment of the present disclosure.

An accumulator discharge conduit 254 is fluidly coupled to the accumulator 242. The accumulator discharge conduit 254 may be connected to the second conduit 230, and may be extended, via a conduit 259, to an auxiliary circuit 256, such as, e.g., a second hydraulic circuit, such as, e.g. for tilt hydraulic actuators (not shown). The accumulator discharge conduit 254 may include at least one of a one way check valve 258 and an accumulator discharge valve 260. The accumulator discharge valve 260 is adapted to be controlled by the controller 214. The accumulator discharge valve 260 may be in communication with the controller 214. The accumulator discharge valve 260 can be solenoid controlled proportional valves capable of receiving communication of displacement input signal from the controller 214, and moving between an open and a closed position. The accumulator discharge conduit 254 may include an auxiliary valve 257 upstream of the auxiliary circuit 256. The auxiliary valve 257 may be in communication with the controller 214. The auxiliary valve 257 can be solenoid controlled proportional valves capable of receiving communication of displacement input signal from the controller 214, and moving between an open and a closed position. In an open position, the accumulator discharge valve 260 may allow fluid from the accumulator discharge conduit 254 to the auxiliary circuit 256. Flow of fluid in the open position of the accumulator discharge valve 260 and the one way check valve 258 is illustrated in FIG. 7. Further, flow of fluid in the open position of the accumulator discharge valve 260 and the one way check valve 258 through the pump motor 222 is also illustrated in FIG. 7.

The hydraulic control system 200 may further include at least one of a shaft speed sensor 262 and a shaft torque sensor 264 (both shown) coupled to the shaft 226 of the power source 108. The shaft speed sensor 262 and the shaft torque sensor 264 are adapted to determine values indicative of the shaft speed and the shaft torque, respectively. The shaft speed sensor 262 and the shaft torque sensor 264 are each in communication with the controller 214 through a communication link 266.

In an embodiment of the present disclosure, pressure sensors 268 and 270 may also be provided to determine the pressure in the first chamber 210 of the hydraulic actuator 122 and the second chamber 212 of the hydraulic actuator 122, respectively. Pressure value information pertaining to the first chamber 210 and the second chamber 212 can be provided to the controller 214 via the communication links 272 and 274, respectively. A position sensor 276 may be provided on one or each of the hydraulic actuators 122. The position sensor 276 may be adapted to relative position of the piston-rod assembly 204. The position sensor 276 may also be in communication with the controller 214 that can calculate via algorithms other cylinder information such as, e.g., the speed and direction of movement of the piston-rod assembly 204 of the hydraulic actuator 122.

The hydraulic control system 200 further includes a set of check valves 278, 280, and a filter element 282. The set of check valves 278, 280, and a filter element 282 are provided on the sixth conduit 240. In an embodiment of the present disclosure, the set of check valves 278, 280 are one directional spring loaded check valves allow flow from only one direction and have a spring setting correlated to a predefined pressure.

The controller 214 may include a processor (not shown) and a memory component (not shown). The processor may include microprocessors or other processors as known in the art. In some embodiments the processor may include multiple processors. The processor may process inputs from the sensors 232, 250, 262, 264, 268, 270, and 276. Since all the valves, such as the first valve 234A, the regenerative valve 236, the second valve 238A, the accumulator charge valve 246, the accumulator discharge valve 260, are solenoid valves the controller may move the valves between their open positions to closed positions.

In one scenario of operation of the machine 100, shown in FIG. 4, the input device 116 is placed in a position to lower the boom element from an elevated position, which is input device position is provided to the controller 214. When the load calculated by the pressure values of the first chamber 210 and the second chamber 212 of the hydraulic actuator 122 is at or above a first preset value, the controller 214 may implement an energy recovery strategy via the pump motor 222 and the regenerative valve 236. Here, the controller 214 may provide a command to selectively actuate the regenerative valve 236 to allow a flow of a first portion of fluid from the first chamber 210 to the second chamber 212 via the fifth conduit 243. Simultaneously, the controller 214 may provide a command to selectively actuate the first valve 234A to allow a second portion of fluid from the first chamber 210 to flow to the fluid reservoir 220 through the pump motor 222 via the second conduit 230. The controller 214 may further provide a pump motor command to set the pump motor 222 to operate as a motor. In this case the flow of fluid from the first chamber 210 through the pump motor 222 provides a power output to the shaft 226, and supplements the power generated from the power source 108 to reduce a power needed from the power source 108.

When the pressure at the accumulator 242 is below a threshold pressure, the controller 214 may implement an energy storage strategy. The controller 214 may allow at least a portion of the fluid to be communicated from the first chamber 210 to the accumulator 242, through the accumulator conduit 244, to charge the accumulator 242 via the accumulator charge valve 246, as shown in FIG. 5. Here, when the controller 214 has calculated that the power in the power source 108 is greater than power threshold, based on at least the shaft speed sensor 262 and the shaft torque sensor 264, the controller 214 may provide a command to move the first valve 234A to a closed position, a command to move the accumulator charge valve 246 to an open position, and a command to move the discharge valve 260 to a closed position to allow fluid to be communicated from the first chamber 210 to the accumulator 242 to charge the accumulator 242.

In the above scenario, the controller 214 may provide a command to keep the second valve 238A closed to inhibit direct discharge of pressurized fluid from the hydraulic actuator 122 to the fluid reservoir 220. However, in case the controller 214 senses an operators input to quickly lower the implement system 110, the controller 214 may command the second valve 238A to at least partially open to allow a portion of the pressurized fluid from the hydraulic actuator 122 to the fluid reservoir 220.

In alternative embodiment, the controller 214 may implement a non-energy recovery strategy when there is a risk of damage to the pump motor 222. The controller 214 may command the second valve 238A to open when the controller 214 has calculated that the power of the power source 108 to be greater than a power threshold and the accumulator 242 is charged via input of the accumulator pressure sensor. Here, the fluid is communicated from the hydraulic actuator 122 directly to the fluid reservoir 220, bypassing the accumulator 242 and the pump motor 222 via the sixth conduit 240.

In an alternative embodiment, the controller may implement a pump displacement reduction strategy. Here, the controller 214 may determine the power of the power source 108 to be greater than a second power threshold based on inputs from the shaft speed sensor 262 and the shaft torque sensor 264 via communication link 266. Further the controller 214 may determine the pressure at the hydraulic actuator 122 is beyond a second predetermined threshold based on the inputs from the pressure sensors 268 and 270 via the communication links 268 and 270. Based on this, the controller 214 may change or reduce a displacement of the pump motor 222 for increasing pressure output from the pump motor 222.

Figure 6:
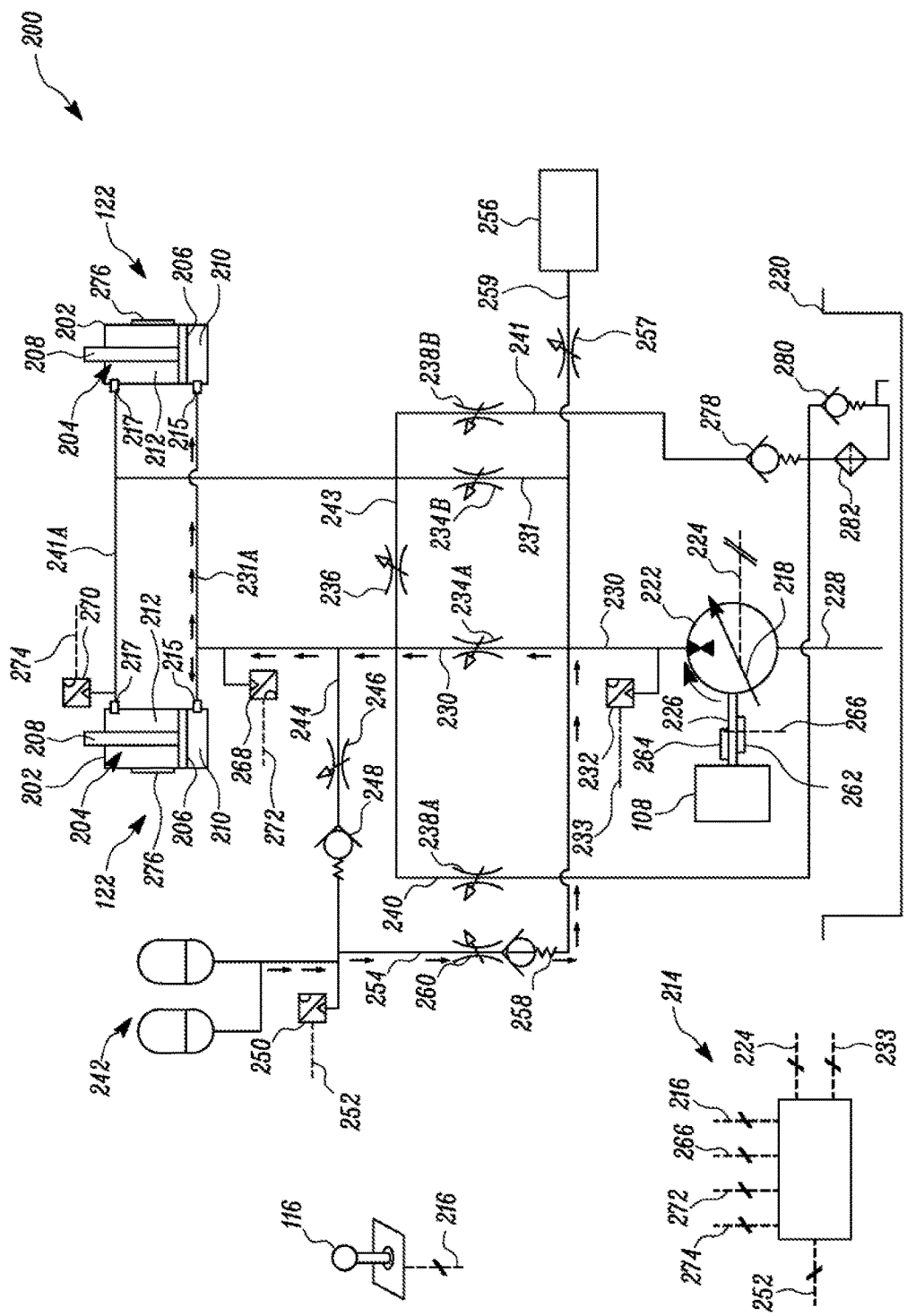
FIG. 6 is another schematic illustration of the hydraulic control system, according to an embodiment of the present disclosure.

In another embodiment, the controller 214 may implement an accumulator energy recovery strategy. As shown in FIG. 6, when the controller 214 determines the pressure of the accumulator 242 is beyond a predetermined threshold, for example the accumulator 242 is charged, and there is an operators input to raise the implement system 110, the controller 214 may command to move the accumulator charge valve 246 to a closed position, and may command to move the discharge valve 260 to an open position. Further, the controller 214 may provide a command to move the first valve 234A to the open position. Therefore, at least a portion of the pressurized fluid from the accumulator 242 is supplied through the first valve 234A, to the first chamber 210 of the hydraulic actuator 122.

As another implementation of the accumulator energy recovery strategy, as shown in FIG. 7, the controller 214 may determine the pressure of the accumulator 242 and the pressure of the hydraulic actuator 122 to be beyond a predetermined threshold, for example, when both the accumulator 242 is charged and the hydraulic actuator 122 does not require pressure input, the controller 214 may command to move the accumulator charge valve 246 to a closed position, and may command to move the discharge valve 260 to an open position. The controller 214 may provide a command to move the first valve 234A to a closed position. Therefore, at least a portion of the pressurized fluid from the accumulator 242 is supplied through the pump motor 222 to provide the power output to the shaft 226 and reduce a power needed from the power source 108. Also, the controller 214 may command to move the auxiliary valve 257 for the auxiliary hydraulic circuit 256 to its open position. In this way, at least a portion of the pressurized fluid from the accumulator 242 may also be supplied to the auxiliary hydraulic circuit 256.

Moreover in this scenario, the controller 214 may command to move the accumulator discharge valve 260 to the open position once the controller 214 detects operators input to raise the implement system 110. In this way at least a portion of the pressurized fluid from the accumulator 242 may also be supplied to the hydraulic actuator 122 in combination with the flow from the pump motor 222. The controller 214 may set the pump motor 222 to operate as a pump. Therefore the pressurized fluid from the accumulator 242 may assist the power source 108 driving the pump motor 222.

INDUSTRIAL APPLICABILITY

The hydraulic control system 200 can be used in various machines; the machine may be associated with certain operations for industries, such as mining, construction, agriculture, and transportation. The disclosed hydraulic control system 200 may help to reuse energy stored, that may otherwise get wasted in the form of heat in the fluid reservoir 220. The hydraulic control system 200 further assists the power source, by intermittently reducing load thereon.

Figure 8:
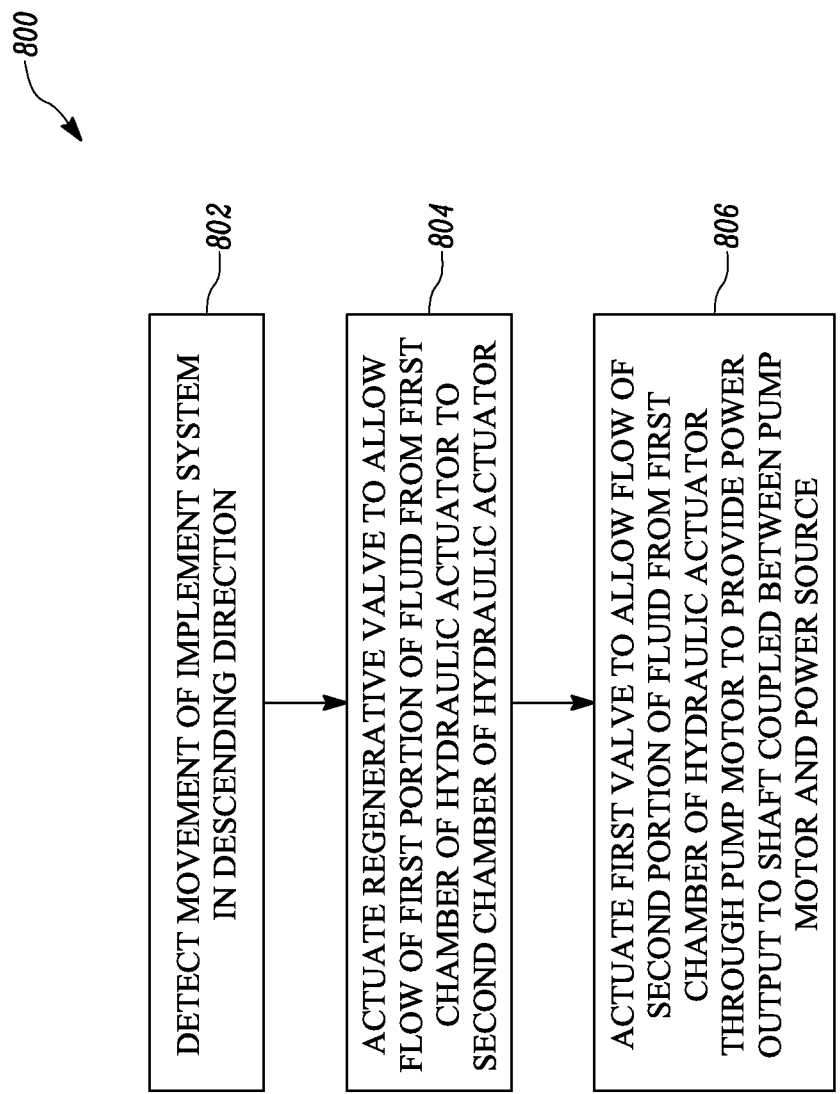
FIG. 8 is a flowchart of a method of operating the hydraulic control system, according to an embodiment of the present disclosure.

FIG. 8 illustrates an exemplary flowchart 800 disclosing operation of the hydraulic control system 200 for a machine 100 having an implement system movable through a range of motion. At step 802, the method can include detecting movement of the implement system 110 in a descending direction. Such a detection of the movement of the implement system 110 may be done based on the input obtained at the controller 214 via the communication link 216 from the operator input device 116. In alternative embodiments, the same detection of movement of the implement system 110 from the in a descending direction may be obtained from the position sensor 276 at the hydraulic actuator 122. At step 804, the method can include actuating the regenerative valve 246 to allow flow of a first portion of a fluid from the first chamber 210 of the hydraulic actuator 122 to the second chamber 212 of the hydraulic actuator 122, as illustrated in FIG. 4. This supply of fluid to the second chamber 212 may help in avoiding internal voiding of the second chamber 212. Also a need of having an additional pump for supplying fluid to the second chamber 212 for anti-voiding can be eliminated. At step 806, the method can include actuating the first valve 234A to allow flow of a second portion (illustrated in FIG. 4) of the fluid from the first chamber 210 of the hydraulic actuator 122 through the pump motor 222 to provide a power output to the shaft 226 coupled between the pump motor 222 and the power source 108. Such actuation of the first valve 234A to an open position thereof is done by the controller 214. Simultaneously, the controller 214 switches the pump motor 222 to work as a motor.

According to an embodiment of the present disclosure, the controller 214 may sense the input from the operator to quickly lower the implement system 110. The controller 214 may then command to actuate the second valve 238A to an open position, and allow a portion of the fluid to be communicated therethrough to the fluid reservoir 220.

The controller 214 may further determine the power source power output based on shaft speed and shaft torque, from the sensors 264 and 264 through the communication link 266. When the power source power output is greater than a power threshold, the controller 214 may move the first valve 234A to a closed position; and move the accumulator charge valve 246 to an open position, the second valve 238A to a closed position to allow fluid to be communicated from the first chamber 210 to the accumulator 242 for charging the accumulator 242.

The controller 214 may further be adapted to reduce a displacement of the pump motor 222 thereby reducing fluid through it, when the pressure at the hydraulic actuator 122 is beyond a predetermined threshold, and the power of the power source is greater than a second power threshold. While doing so, the controller 214 may keep the regenerative valve 236 and the accumulator charge valve 246 in open position and the second valve 238A in closed position.

Further, as illustrated in FIG. 5, the controller 214 may be adapted to move the accumulator charge valve 246 to a closed position, when the respective pressure at the accumulator 242 and the hydraulic actuator 122 are beyond predetermined thresholds. Further the controller 214 may move the accumulator discharge valve 260 to an open position to allow fluid to be communicated from the accumulator 242 to the auxiliary hydraulic circuit 256.

Further once the controller 214 detects an operators input to raise the implement system 110, and the pressure in the accumulator 242 is beyond a predetermined threshold, the controller 214 may close the valve 257 for the auxiliary hydraulic circuit 256, open the first valve 234A, and close the accumulator charge valve 246. The controller 214 may set the pump motor 222 to be operational as a pump. Therefore, the flow from the accumulator discharge valve 260 may assist the flow from the pump motor 222, for raising the implement system 110. However, if the accumulator pressure is beyond the predetermined threshold, the controller 214 may set the pump motor 222 operation as a motor, and close the first valve 234A, and then the flow from the accumulator discharge valve 260 may provide the power output to the shaft 226 and reduce a power needed from the power source 108.

With the present disclosure, the system 200 and the method 700 enable better utilization of the energy stored in the fluid contained in the actuators 122. Specifically, by selectively supplying the pressurized fluid contained in the actuators 122 to the pump motor 222, the system 200 enables utilization of the stored energy in supplementing the power source 108. Further the disclosed system 200 and the method 700 allow for energy recirculation using a single pump motor 222. Therefore a need of having a separate motor and pump is also eliminated. Further, the present disclosure offers a technique regulates the valves such that accumulators 242 may also assist the power source 108 or supply fluid to the auxiliary circuit 256.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic control system for a machine, the hydraulic control system comprising:
a fluid reservoir;
a pump motor coupled to a power source via a shaft, the pump motor fluidly coupled to the fluid reservoir, the pump motor configured to provide pressurized fluid and to receive fluid to provide a power output to the shaft;
a hydraulic actuator having a first chamber and a second chamber, each of the chambers being fluidly coupled to the pump motor;
an accumulator fluidly coupled to one of the chambers of the hydraulic actuator to receive fluid from the hydraulic actuator for storage and to the pump motor, wherein in a first mode the accumulator is configured to provide stored fluid to the pump motor and in a second mode the pump motor is configured to provide pressurized fluid to the accumulator;
a first valve fluidly coupled between the first chamber of the hydraulic actuator and the pump motor, the first valve movable between an open position and a closed position;
a regenerative valve fluidly coupled between the first chamber of the hydraulic actuator and the second chamber of the hydraulic actuator, the regenerative valve movable between an open position and a closed position; and
a controller in communication with the first valve and the regenerative valve, the controller configured to:
selectively actuate the regenerative valve to allow flow of a first portion of the fluid from the first chamber of the hydraulic actuator to the second chamber of the hydraulic actuator, and
selectively actuate the first valve to allow flow of a second portion of the fluid from the first chamber of the hydraulic actuator through the pump motor to provide the power output to the shaft and reduce a power needed from the power source.

2. The hydraulic control system of claim 1 comprising:
a shaft speed sensor and a shaft torque sensor coupled to the shaft and in communication with the controller to indicate the shaft speed and the shaft torque of the shaft; and
an accumulator charge valve fluidly coupled between the first chamber of the hydraulic actuator and the accumulator, the accumulator charge valve movable between an open position and a closed position;
wherein the controller is configured to:
calculate the power demand of the power source based on the shaft speed and shaft torque, and when the power demand is greater than a power threshold, the controller is configured to,
move the first valve from the open position to the closed position;
move the accumulator charge valve to the open position to allow fluid to be communicated from the first chamber of the actuator to the accumulator for storage.

3. The hydraulic control system of claim 2, further comprising:
a second valve fluidly coupled between the hydraulic actuator and the fluid reservoir, the second valve movable between an open position and a closed position, wherein the controller is configured to:
receive an input signal indicative of a pressure at the accumulator;
receive an input signal indicative of a pressure at the first chamber of the hydraulic actuator;
receive an input signal indicative of an operator input to lower an implement system connected to the hydraulic actuators at a predetermined rate; and
move the second valve to the open position to allow at least a portion of the fluid to be communicated from the first chamber of the actuator to the fluid reservoir when the accumulator pressure is greater than a threshold pressure and the actuator pressure is greater than a threshold pressure.

4. The hydraulic control system of claim 3, further comprising an accumulator discharge valve fluidly coupled between the accumulator and the pump motor, the accumulator discharge valve movable between an open position and a closed position, wherein the controller is configured to:
change a displacement of the pump motor to increase pressure output, when the pressure at the hydraulic actuator is beyond greater than a predetermined threshold, and the power demand of the power source is greater than a second power threshold;
move the regenerative valve and the accumulator charge valve to the open position; and
move the second valve from the open position to the closed position and the accumulator discharge valve to the closed position.

5. The hydraulic control system of claim 2, further comprising an accumulator discharge valve fluidly coupled between the accumulator and the pump motor, the accumulator discharge valve movable between an open position and a closed position, wherein the controller is configured to:
move the accumulator charge valve to the closed position when the respective pressures of the accumulator and the hydraulic actuator are greater than respective predetermined thresholds; and
move the accumulator discharge valve to the open position to allow fluid to be communicated from the accumulator to an auxiliary hydraulic circuit that is in fluid communication with the accumulator.

6. The hydraulic control system of claim 2, further comprising an accumulator discharge valve fluidly coupled between the accumulator and the pump motor, the accumulator discharge valve movable between an open position and a closed position, wherein the controller is configured to:
move the accumulator discharge valve to the open position; and
move the accumulator charge valve, the second valve and the first valve to the closed position to supply fluid from the accumulator through the pump motor to provide the power output to the shaft.

7. The hydraulic control system of claim 2, further comprising an accumulator discharge valve fluidly coupled between the accumulator and the first chamber of the actuator, the accumulator discharge valve movable between an open position and a closed position, wherein the controller is configured to:
move the accumulator discharge valve to the open position to supply fluid from the accumulator to the first chamber of the hydraulic actuator when the operators input is detected to raise the implement system and the pressure in the accumulator is greater than a predetermined threshold.

8. A method of operating a hydraulic control system having an implement system movable through a range of motion, the method comprising:
detecting movement of an implement system in a descending direction;
actuating a regenerative valve to allow flow of a first portion of a fluid from a first chamber of a hydraulic actuator to a second chamber of the hydraulic actuator;
actuating a first valve to allow flow of a second portion of the fluid from the first chamber of the hydraulic actuator through a pump motor to provide a power output to a shaft coupled between the pump motor and a power source.

9. The method of claim 8 further comprising:
determining a power source power output based on a shaft speed and a shaft torque of a shaft coupling the power source and the pump motor; when the power source power output is greater than a power threshold, the method further comprises:
moving the first valve from an open position to a closed position;
moving an accumulator charge valve to an open position to allow fluid to be communicated from the first chamber of the actuator to an accumulator for charging the accumulator.

10. The method of claim 9 further comprising:
determining a pressure of the accumulator;
determining a pressure of the first chamber of the hydraulic actuator;
determining an operator input in a position to lower the implement system connected to the hydraulic actuators at a predetermined rate; and
moving a second valve to an open position to allow fluid to be communicated from the first chamber of the actuator to the fluid reservoir while keeping each of the regenerative valve, the first valve and the accumulator charge valve in an open position.

11. The method of claim 10 further comprising:
changing a displacement of the pump motor to increase pressure output when pressure at the hydraulic actuator is beyond a predetermined threshold and the power of the power source is greater than a second power threshold;
moving the regenerative valve and the accumulator charge valve in the open position; and
moving the accumulator discharge valve in the closed position.

12. The method of claim 9 further comprising:
moving the accumulator charge valve to a closed position when the respective pressures of the accumulator and the hydraulic actuator are greater than predetermined thresholds; and
moving an accumulator discharge valve to the open position to allow fluid to be communicated from accumulator to an auxiliary hydraulic circuit.

13. The method of claim 9 further comprising:
moving an accumulator discharge valve to the open position;
moving the accumulator charge valve and the first valve to the closed position to facilitate the supply of fluid from the accumulator through the pump motor to provide the power output to the shaft.

14. The method of claim 9 further comprising:
moving an accumulator discharge valve and the first valve to the open position to facilitate the supply of fluid from the accumulator to the first chamber of the hydraulic actuator when the operator input is in a position to command raising the implement system and the pressure in the accumulator is greater than a predetermined threshold.

15. A machine having an implement system movable through a range of motion, the machine comprising:
a power source;
a fluid reservoir;
a pump motor coupled to a power source via a shaft, the pump motor fluidly coupled to the fluid reservoir, the pump motor configured to provide pressurized fluid and to receive fluid to provide a power output to the shaft;
a hydraulic actuator having a first chamber and a second chamber, each of the chambers being fluidly coupled to the pump motor;
an accumulator fluidly coupled to one of the chambers of the hydraulic actuator to receive fluid from the hydraulic actuator for storage and to the pump motor, wherein in a first mode the accumulator is configured to provide stored fluid to the pump motor and in a second mode the pump motor is configured to provide pressurized fluid to the accumulator;
a first valve fluidly coupled between the first chamber of the hydraulic actuator and the pump motor, the first valve movable between an open position and a closed position;
a regenerative valve fluidly coupled between the first chamber of the hydraulic actuator and the second chamber of the hydraulic actuator, the regenerative valve movable between an open position and a closed position; and
a controller in communication with the first valve and the regenerative valve, the controller configured to,
selectively actuate the regenerative valve to allow flow of a first portion of the fluid from the first chamber of the hydraulic actuator to the second chamber of the hydraulic actuator; and
selectively actuate the first valve to allow flow of a second portion of the fluid from the first chamber of the hydraulic actuator through the pump motor to provide the power output to the shaft and reduce a power needed from the power.

16. The machine of claim 15 comprising:
a shaft speed sensor and a shaft torque sensor coupled to the shaft and in communication with the controller to indicate the shaft speed and the shaft torque of the shaft;
an accumulator charge valve fluidly coupled between the first chamber of the hydraulic actuator and the accumulator, the accumulator charge valve movable between an open position and a closed position; and
wherein, the controller is configured to:
calculate the power demand of the power source based on the shaft speed and shaft torque, and when the power demand is greater than a power threshold, the controller is configured to,
move the first valve from the open position to the closed position;
move the accumulator charge valve to the open position to allow fluid to be communicated from the first chamber of the actuator to the accumulator for storage.

17. The machine of claim 16, further comprising:
a second valve fluidly coupled between the hydraulic actuator and the fluid reservoir, the second valve movable between an open position and a closed position, wherein the controller is configured to:
receive an input signal indicative of a pressure at the accumulator;
receive an input signal indicative of a pressure at the first chamber of the hydraulic actuator;
receive an input signal indicative of an operator input to lower an implement system connected to the hydraulic actuators at a predetermined rate; and
move the second valve to the open position to allow at least a portion of the fluid to be communicated from the first chamber of the actuator to the fluid reservoir when the accumulator pressure is greater than a threshold pressure and the actuator pressure is greater than a threshold pressure.

18. The machine of claim 17, further comprising an accumulator discharge valve fluidly coupled between the accumulator and the pump motor, the accumulator discharge valve movable between an open position and a closed position, wherein the controller is configured to:
move the accumulator discharge valve to the open position; and
move the accumulator charge valve, the second valve and the first valve to the closed position to supply fluid from the accumulator through the pump motor to provide the power output to the shaft.

19. The machine of claim 16, further comprising an accumulator discharge valve fluidly coupled between the accumulator and the first chamber of the actuator, the accumulator discharge valve movable between an open position and a closed position, wherein the controller is configured to:
move the accumulator discharge valve to the open position to supply fluid from the accumulator to the first chamber of the hydraulic actuator when the operators input is detected to raise the implement system and the pressure in the accumulator is greater than a predetermined threshold.

20. The machine of claim 16 further comprising an accumulator discharge valve fluidly coupled between the accumulator and the first chamber of the actuator, the accumulator discharge valve movable between an open position and a closed position, wherein the controller is configured to:
assist the power source driving the pump motor by moving the accumulator discharge valve to the open position to supply fluid from the accumulator to the first chamber of the hydraulic actuator when, upon detecting is the operators input is detected to raise the implement system and detecting the pressure in the accumulator is to be greater than a predetermined threshold.

* * * * *